United States Patent
Bureau et al.

Patent Number: 5,437,195
Date of Patent: Aug. 1, 1995

[54] MECHANICAL SENSOR PRODUCED FROM A POLYMER FILM

[75] Inventors: Jean-marc Bureau, Palaiseau; Gérard Coussot, Paris, both of France

[73] Assignee: Thomson-CSF, Puteaux, France

[21] Appl. No.: 306,710

[22] Filed: Sep. 15, 1994

Related U.S. Application Data

[63] Continuation of Ser. No. 989,655, Dec. 14, 1992, abandoned.

[30] Foreign Application Priority Data

Dec. 17, 1991 [FR] France .................. 91 15640

[51] Int. Cl.⁶ .................................................. G01L 1/00
[52] U.S. Cl. .................................... 73/862.28; 73/777; 73/862.629; 310/800
[58] Field of Search .............. 73/776, 777, 862.68, 73/862.629; 33/DIG. 13; 338/2, 6; 29/621.1; 310/800

[56] References Cited

U.S. PATENT DOCUMENTS

| | | | |
|---|---|---|---|
| 3,164,014 | 1/1965 | Redner | 73/862.629 X |
| 3,266,303 | 8/1966 | Pfann | 73/862.68 |
| 3,858,150 | 12/1974 | Gurtler et al. | 73/777 X |
| 4,199,650 | 4/1980 | Mirtich et al. | 428/421 |
| 4,369,391 | 1/1983 | Micheron | 310/800 |
| 4,555,953 | 12/1985 | Dario et al. | 73/862.68 X |
| 4,651,120 | 3/1987 | Aagard | 29/621.1 X |
| 5,172,024 | 12/1992 | Broussoux et al. | 310/800 X |

FOREIGN PATENT DOCUMENTS

| | | |
|---|---|---|
| 65419 | 11/1982 | European Pat. Off. . |
| 87665 | 9/1983 | European Pat. Off. . |
| 321225 | 6/1989 | European Pat. Off. . |
| 451636 | 10/1991 | European Pat. Off. . |
| 2196790 | 5/1988 | United Kingdom ............. 73/862.68 |

OTHER PUBLICATIONS

Kagerer, Thin Solid Films, vol. 182, No. 1, Dec. 1989, pp. 333–344. "Ion Beam Sputter Deposition of Thin Film Sensors for Applications in Highly Loaded Contacts".

Norihiro, Patent Abstracts of Japan, JP3093201, Apr. 18, 1991. "Resistance Element, and Changeable Resistor and Heater Using It".

*Primary Examiner*—Richard E. Chilcot, Jr.
*Assistant Examiner*—James M. Olsen
*Attorney, Agent, or Firm*—Oblon, Spivak, McClelland, Maier & Neustadt

[57] ABSTRACT

The invention is a mechanical sensor produced from a polymer film whose upper part (A) is made conductive, the lower part (B) remaining an insulator. When a strain is applied, the mechanical sensor according to the invention distorts, varying the resistance of part (A) and thus allowing the strain to be measured. Preferably, the polymer used is a thermostable polymer.

18 Claims, 2 Drawing Sheets

MECHANICAL SENSOR PRODUCED FROM A POLYMER FILM

This application is a Continuation of Ser. No. 07/989,655, filed on Dec. 14, 1992, now abandoned.

BACKGROUND OF THE INVENTION

This invention is a mechanical sensor produced from a polymer film and designed to measure strains such as those caused by movements, distortion or pressure.

Today, devices to measure the strains which can occur in various parts or components are employed in as widely differing industries as the car, medical, and household appliance industries.

One of the techniques most frequently used to measure mechanical strains is to apply a flexible electrically conductive device in contact with the component in question. As it moves or distorts, the object induces a strain in the mechanical sensor, causing it to distort and thus varying its electrical resistance.

SUMMARY OF THE PRIOR ART

The prior art already includes mechanical sensors employing polymer films whose insulating and mechanical properties (flexibility, elasticity) make it possible to obtain a thin-film insulating material capable of absorbing large distortion and easy to attach to the component whose distortion (elongation, bending, etc.) is to be measured. A thin layer of metal is applied to the polymer film to form the element sensitive to strain.

A noble metal, for example gold, is normally employed to avoid aging problems such as oxidation. However, a noble metal is relatively difficult to bond to a polymer and the difference between the mechanical properties of the polymer and the metal layer (modulus of elasticity, thermal coefficient of expansion) lead to premature fatigue problems and cause the temperature characteristic of the device to vary. Moreover, the metal limits the elasticity of the sensor and, therefore, the range over which it remains reversible.

SUMMARY OF THE INVENTION

This invention aims to overcome these disadvantages by using a mechanical sensor consisting of a polymer film whose top layer (A) is made conductive, the remainder of the polymer forming an insulating layer (B). More precisely, the invention is a mechanical sensor which, by distorting, makes it possible to measure the movement or distortion of an object or the strain it imposes. The special feature of the sensor is that it comprises a polymer film whose upper part (A) is made conductive, the lower part (B) remaining an insulator and the resistance of the said part (A) being varied by the distortion of the sensor. Preferably, the upper part (A) includes a pattern of conductive lines aligned with the direction in which the sensor distorts and connected in series to increase the sensitivity of the sensor.

The polymer used is preferably a thermostable polymer and can be a polyimide, a polyphenylquinoxaline or a phenylene polysulfide.

The invention is also a method of producing the mechanical sensor using a polymer film in which one surface of the film is irradiated by an ion beam to form a conductive upper part (A), leaving the lower part (B) as an insulator. The film can be irradiated by the ion beam via a mask to form patterns of conductive lines, aligned with the direction in which the sensor distorts. These conductive lines can also be produced by reactive ionic etching or photoablation, using an excimer laser, of the irradiated part (A).

In the process according to the invention, the polymer used can advantageously be a polyimide and the ionic irradiation can be obtained using a beam of $N_2^+$ ions at a energy level of approximately 150 keV.

BRIEF DESCRIPTION OF THE DRAWINGS

The invention will be better understood and other advantages will become clear upon reading the following description and referring to the appended figures of which.

DETAILED DESCRIPTION OF THE DRAWINGS

The principle on which the mechanical sensor according to the invention operates is that the resistance of the irradiated layer varies as the sensor is distorted.

Figure 1:
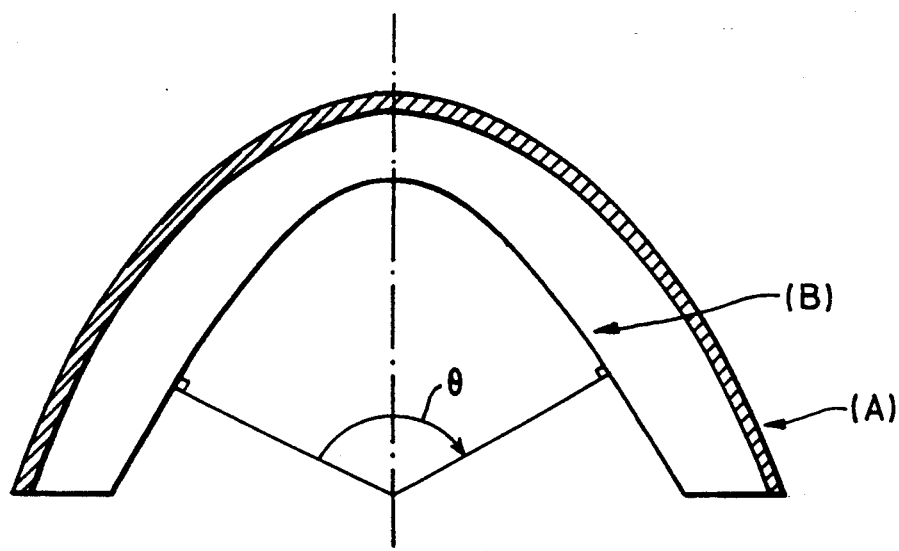
FIG. 1 is a diagram of a mechanical sensor according to the invention, distorted by bending.

The mechanical sensor shown in FIG. 1 can be used to measure the flection of an object (for example, in a medical application, the flection of a member). When the sensor is attached to the object, it undergoes the same flection as the object and it can be shown that, if the conductive part (A) is on the convex face of the film, the variation in the resistance $\Delta R$ of this part is given by the formula:

$$\Delta R = K R_o \theta$$

where
$R_o$ is the resistance of part (A) when the film is not bent.
K is a constant depending on the geometry of the gauge.
$\theta$ is the bend angle, expressed in degrees.

The variation in resistance $\Delta R$ therefore depends solely on angle $\theta$ representative of the flection. The mechanical sensor according to the invention is capable of withstanding large angular distortion and is not limited by the elasticity of the conductive layer as occurred with sensors according to the prior art; in fact, conductive part (A) is an integral part of the polymer and retains all its mechanical properties; this gives a sensor according to the invention a considerable advantage since it possible to produce a thin-film sensor particularly easy to integrate into the part. The sensor according to the invention preferably consists of a polymer film made more conductive by irradiation using an ion beam and the advantages of using a polymer whose surface has been irradiated for the mechanical sensor mainly lies in the physico-chemical properties of the conductive pan (A)/insulating part (B) obtained. In fact, the irradiated layer is intimately bonded to pan (B) by a progressive interface and the irradiated surface is chemically inert and insensitive to corrosion.

Moreover, ion beam irradiation techniques make it possible to considerably reduce the electrical resistance of polymer films to obtain a sufficiently sensitive sensor.

Figure 2:
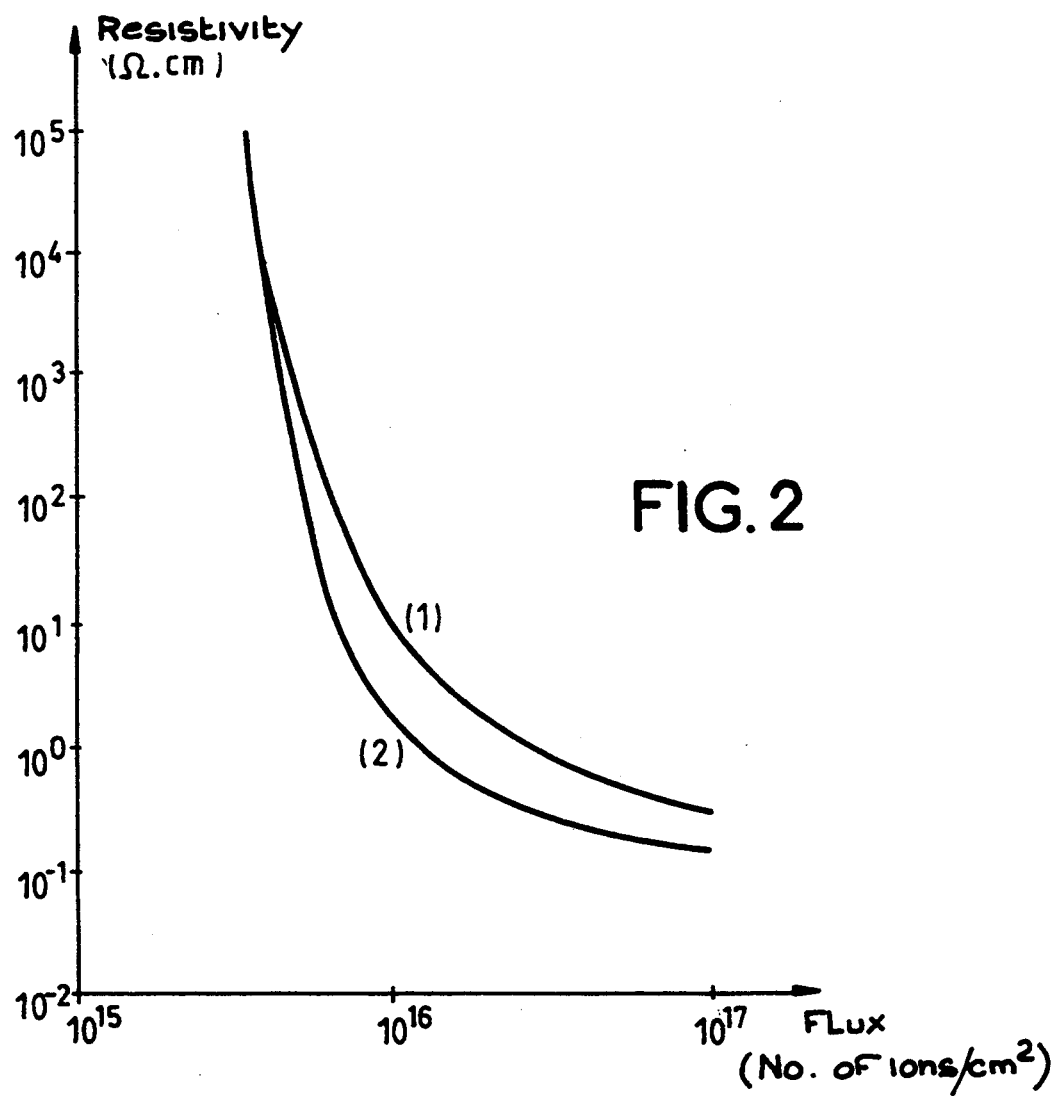
FIG. 2 is a curve of resistivity plotted against ion irradiation dose for several thermostable polymers [(1) Polyimide, (2) Polyphenylquinoxaline])

Conventionally, when measuring a resistance, it is the current through the resistance which is measured and the resistance is measured more accurately when it is low. In the mechanical sensor according to the invention, the top part (A) of the polymer can be irradiated using a high-energy ion beam. FIG. 2 shows the variation in the resistivity of two thermostable polymers plotted against the ion flux (i.e. the number of ions received per cm2). When polyimide and polyphenylquinoxaline are untreated, their resistivities are those of an insulator; when the ion energy is sufficiently high, these polymers can be used to produce polymer films which are conductive at the surface and have a superficial resistance of approximately 100 to 10,000 ohms per cm2. Typically, the ion penetration depth is approximately 1 micron on a film whose total thickness is approximately 100 to 200 microns. To obtain this result, the ion beam can typically be a beam of $N_2^+$ ions with an energy level of approximately 150 keV.

In addition, some sensors must be capable of withstanding high temperatures (to measure strain on hot parts, sterilization for medical applications, etc.).

Figure 3:
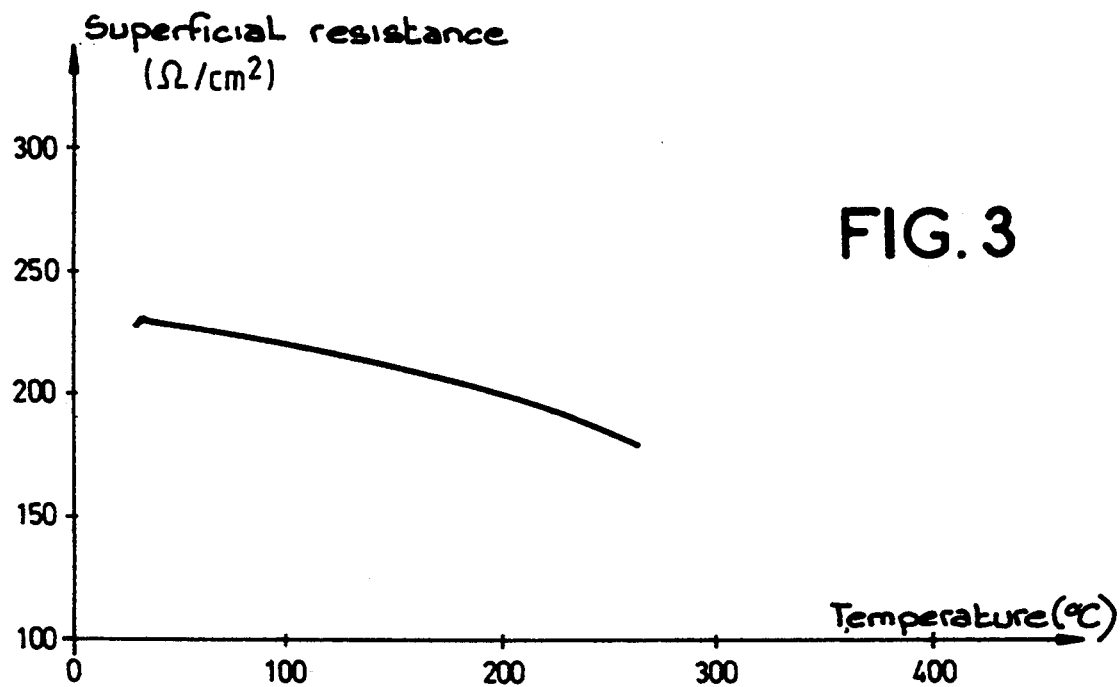
FIG. 3 shows the surface resistance response of an irradiated thermostable polymer to temperature.

Provided a thermostable polymer whose temperature response is particularly stable is used, the sensor according to the invention can satisfy these requirements. These polymers can be polyimides, polyamide imides, polybenzimidazols or phenylene polysulfide. FIG. 3 shows the variation in the surface resistance plotted against temperature for an irradiated polyimide and indicates the high stability of the thermostable polymer after irradiation.

To increase the sensitivity of the sensor according to this invention, it is possible to produce conductive patterns on part (A). These patterns can be lines aligned with the direction in which the sensor distorts and connected in series to amplify the sensor response and, therefore, its sensitivity.

To produce these patterns, either their upper part (A) can be irradiated through a mask or a focussed beam of electrons can be used. It is also possible to produce the patterns on the irradiated pan (A) of the polymer by subsequent etching. This can be done using reactive ion etching or excimer laser etching through a mask produced using conventional techniques and masking resins.

The mechanical sensor can also be used to measure pressure variations. For this purpose, the ends of the polymer film can be attached across an opening in the chamber in which the pressure variations are to be measured and the extent to which the film distorts will then depend on its modulus of elasticity (a lower modulus giving higher distortion). Consequently, when a pressure is applied to a polymer film with a low modulus of elasticity, the film will significantly distort due to the force generated by the pressure and this distortion, representative of the pressure, will cause a variation in the resistance of the conductive part (A) of the film which can be easily detected.

Figure 4:
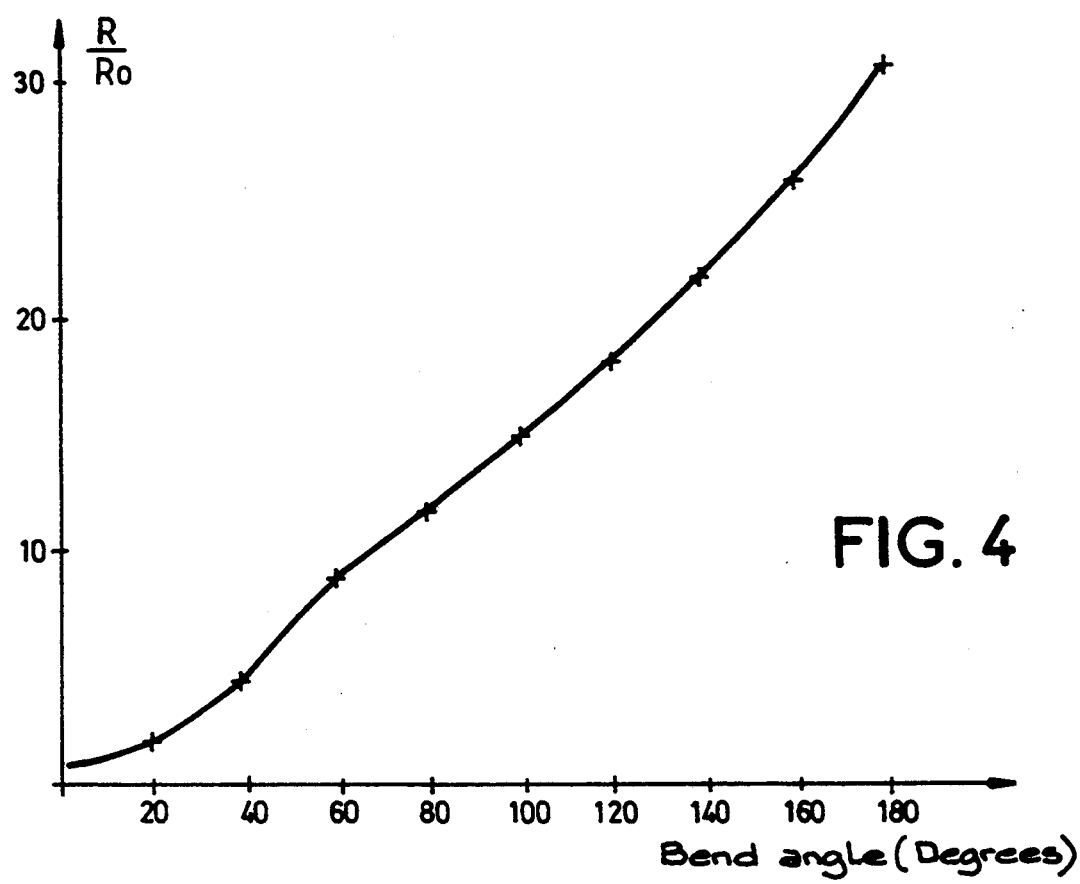
FIG. 4 is a curve of the response of a mechanical sensor according to the invention plotted against the angle through which the film is bent.

To illustrate the type of response that could be obtained from a mechanical sensor according to the invention, a 5 mm by 20 mm film of 250 mm-thick KAPTON polyimide film was irradiated with a beam of $N_2^+$ ions at an energy level of 170 keV (and a flux of $2.5\ 10^{16}$ ions/cm$^2$). FIG. 4 shows the response obtained with such a film and demonstrates the feasibility of using superficially conductive polymer films to measure angular distortion.

What is claimed is:

1. A mechanical sensor for measuring distortion, consisting of a thermostable polymer layer having a major upper surface and a major lower surface, a conductive upper part (A) that is formed in the major upper surface and an insulating lower part (B) which forms the rest of the polymer layer, wherein the resistance of the upper part (A) varies with distortion of the polymer layer.

2. A mechanical sensor as claimed in claim 1 in which the upper part (A) includes linear patterns aligned with the direction of the sensor distortion and connected in series to increase the sensitivity of the sensor.

3. A mechanical sensor as claimed in claim 1 or 2 in which the distortion of the polymer layer is used to measure a pressure applied to the lower part (B) of the polymer layer which is thereby made concave.

4. A mechanical sensor as claimed in claim 1 in which the polymer is a polyimide.

5. A mechanical sensor as claimed in claim 1, in which the polymer is a polyphenylquinoxaline.

6. A mechanical sensor as claimed in claim 1, in which the polymer is a phenylene polysufide.

7. A sensor according to claim 1, further comprising means for measuring the resistance of the upper part (A).

8. A sensor according to claim 1, wherein there is an interface between the upper part (A) and the lower part (B) and the interface is a progressive interface.

9. A mechanical sensor according to claim 1, wherein thickness of the upper part (A) is about 1 micron.

10. A sensor according to claim 9, wherein thickness of both the upper part (A) and the lower part (B) is between 100 and 200 microns.

11. A sensor according to claim 1, further comprising an aperture formed by rigid material; and
wherein the film is attached over the aperture to block the aperture.

12. A sensor according to claim 1 or claim 2, wherein the polymer layer is an ion-beam irradiated polymer layer.

13. A sensor according to claim 1, wherein the resistivity as a function of bend angle of the polymer layer is approximately linear over the range between 0 and 180 degrees.

14. A sensor according to claim 1 in which the polymer layer is bent at a bend angel of between 10 and 180 degrees.

15. A sensor according to claim 14, wherein the bent polymer layer major upper surface, which includes the upper part, is convex.

16. A sensor according to claim 15, wherein the resistivity of the upper part is less than 100 ohms per centimeter.

17. A sensor according to claim 14, wherein the upper part consists of ion irradiated thermostable polymer.

18. A sensor according to claim 17, wherein the upper part consists of ion irradiated thermostable polymer of the same composition as the lower part, but which has been irradiated at an ion flux density of greater than about $10^{16}$ ions per square centimeter.

* * * * *